United States Patent [19]

Conroy et al.

[11] Patent Number: 4,696,754

[45] Date of Patent: Sep. 29, 1987

[54] LUBRICANT-STABILIZER COMPOSITIONS FOR HALOGEN-CONTAINING ORGANIC POLYMERS AND POLYMER COMPOSITIONS THEREOF

[75] Inventors: Gary M. Conroy; Karl R. Wursthorn, both of Cincinnati, Ohio

[73] Assignee: Morton Thiokol, Inc., Chicago, Ill.

[21] Appl. No.: 895,183

[22] Filed: Aug. 11, 1986

[51] Int. Cl.$^4$ .................................. C10M 129/30
[52] U.S. Cl. .................. 252/40.5; 524/301; 252/39; 252/56 S
[58] Field of Search .............. 252/56 S, 39, 40.5; 524/301

[56] References Cited

U.S. PATENT DOCUMENTS

| | | | |
|---|---|---|---|
| 2,440,985 | 5/1948 | Sutherland | 260/36 |
| 2,609,355 | 9/1952 | Winkler | 260/45.8 |
| 2,719,140 | 9/1955 | Slocombe et al. | 260/45.85 |
| 2,795,570 | 6/1957 | Fuchs et al. | 524/285 |
| 3,240,750 | 3/1966 | Bonvicini | 260/45.85 |
| 3,351,576 | 11/1967 | Oakes | 524/178 |
| 3,356,633 | 12/1967 | Graham | 260/31.6 |
| 3,376,256 | 4/1968 | Klemchuk | 260/45.75 |
| 3,379,679 | 4/1968 | Besso | 524/301 |
| 3,448,067 | 6/1969 | Penneck | 260/23 |
| 3,499,860 | 3/1970 | Penneck | 260/23 |
| 3,578,621 | 5/1971 | Stapfer | 260/31.6 |
| 3,644,246 | 2/1972 | Lozanou | 260/23 X A |
| 3,666,510 | 5/1972 | Coaker | 106/181 |
| 3,917,555 | 11/1975 | Worscheck et al. | 260/31.4 R |
| 3,933,740 | 1/1976 | Hopkins et al. | 260/45.75 W |
| 4,111,886 | 9/1978 | Lindner et al. | 260/31.8 T |
| 4,111,889 | 9/1978 | Kaneko et al. | 260/31.8 M |
| 4,154,707 | 5/1979 | Honsberg et al. | 260/3.5 |
| 4,157,990 | 6/1979 | Lindner et al. | 252/56 S |
| 4,614,604 | 9/1986 | Helfert et al. | 252/56 S |

*Primary Examiner*—Jacqueline V. Howard
*Attorney, Agent, or Firm*—Richard J. Sheridan; Gerald K. White

[57] ABSTRACT

Compositions comprising a combination of a dihydrocarbyl ester of maleic acid and a metal salt of a monohydrocarbyl ester of maleic acid are useful as lubricant-stabilizers for halogen-containing organic polymers and provide unique lubricating-stabilizing characteristics to polymers stabilized therewith.

25 Claims, 6 Drawing Figures

LUBRICANT-STABILIZER COMPOSITIONS FOR HALOGEN-CONTAINING ORGANIC POLYMERS AND POLYMER COMPOSITIONS THEREOF

FIELD OF THE INVENTION

This invention relates to compositions for providing unique lubricating-stabilizing characteristics to halogen-containing organic polymers and stabilizing said polymers against the deteriorative effects of heat, light and weathering. The invention also relates to halogen-containing organic polymers lubricated and stabilized with such compositions and to a process for lubricating and stabilizing such resins.

BACKGROUND TO THE INVENTION

It has been known that halogen-containing organic polymers, especially vinyl chloride polymers, are not stable under the action of heat, light and weathering and are subject to deterioration or degradation. Numerous chemicals and chemical compositions have been proposed to combat these adverse effects. For the most part, these stabilizers have been directed toward stabilization of the polymer against heat encountered during processing of the polymer and its fabrication into articles. In addition, in order to satisfactorily process the polymer it has also been necessary to employ lubricants, such as external and internal lubricants.

For example, in U.S. Pat. No. 3,644,246, issued Feb. 22, 1972, to M. Lozemou, it has been proposed to use a metal salt of a monoalkyl ester of an unsaturated dicarboxylic acid in combination with an organotin carboxylate as a composition for lubricating heat and light stabilization of chlorine-containing polymers.

Additionally, in U.S. Pat. No. 3,578,621, issued May 11, 1971, to C. Stapfer, and U.S. Pat. No. 4,111,889, issued Sept. 5, 1978, to Kaneko et al, it is suggested that diesters of both saturated and unsaturated diacids be employed as lubricants for halogen-containing polymers.

In practice, however, it has been recognized that the diesters of unsaturated dicarboxylic acids, such as distearyl maleate, while providing some degree of stabilization to the polymers, also produce undesirably poor lubrication properties, particularly undesirably poor fusion time properties.

On the other hand, the metal salts of monoesters of unsaturated dicarboxylic acids, while providing a good degree of lubrication properties to the polymers, are quite poor stabilizers and produce undesirable yellowing in the polymer.

It would be highly desirable if the good lubrication properties could be obtained in halogen-containing resins without producing the highly undesirable yellowing of the polymer compositions. Likewise, it would be highly desirable to obtain good stabilization effects in the polymer compositions without adversely affecting the lubricating properties, particularly the fusion time characteristics, of the polymer compositions.

BRIEF SUMMARY OF THE INVENTION

It has now been unexpectedly discovered that the excellent lubricating properties imparted to halogen-containing organic polymers by calcium salts of monoesters of maleic acid can be maintained by replacing from 50 to 85% by weight thereof, preferably about 60%, with certain dihydrocarbyl esters of maleic acid and that the combination imparts unique lubricating characteristics to the polymer compositions while also providing improved resistance to thermal and heat degradation and especially improved resistance to degradation from weathering and UV light.

It has been quite unexpectedly found that partial replacement (50 to 85%) of a good lubricant, e.g. calcium bis(stearyl maleate), with certain poor lubricants, e.g. distearyl maleate, would not impair or decrease the lubrication performance of the composition. Moreover, the adverse yellowing effects previously obtained with the calcium salt of the monoester of maleic acid is eliminated or substantially reduced by the addition of the diester compounds. In general, these lubricant-stabilizer compositions will be employed in combination with primary stabilizer to provide an added co-stabilization effect.

DETAILED DESCRIPTION OF THE INVENTION

Figure 1:
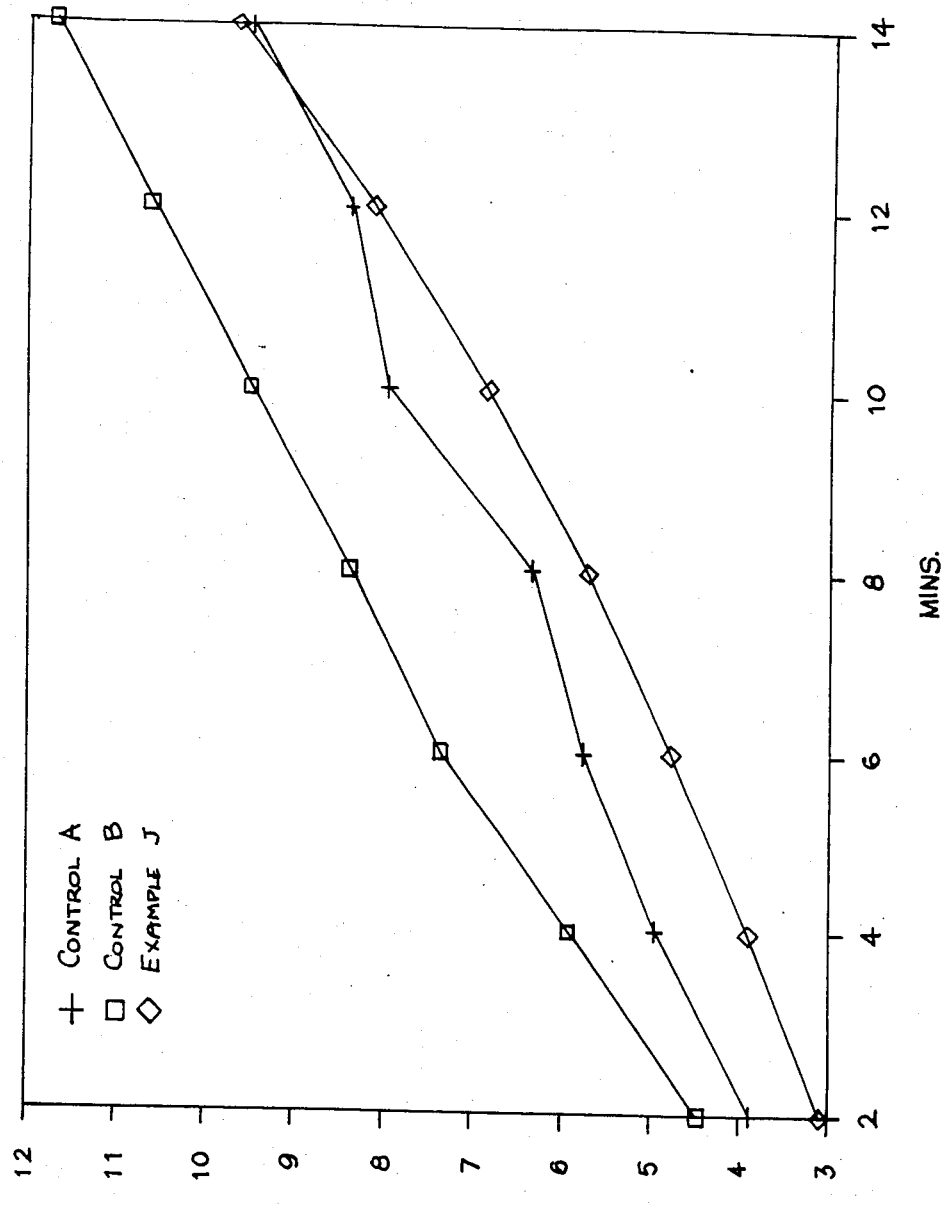
FIG. 1 is a plot of total color change at various times for polymeric compositions undergoing dynamic mill testing and containing a lubricating-stabilizing composition of this invention and for two control compositions.

The lubricating-stabilizing compositions of this invention comprise a combination of (a) a dihydrocarbyl ester of maleic acid of the formula:

wherein $R^1$ and $R^2$ are straight or branched chain alkyl or alkenyl radicals of at least 8 carbon atoms, preferably from about 8 to about 24 carbon atoms, and most preferably 18 carbon atoms, with (b) a calcium salt of a monohydrocarbyl ester of maleic acid of the formula:

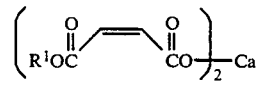

wherein $R^1$ is as defined above. In these lubricating-stabilizing compositions the diester component comprises from about 50 to about 85% by weight, preferably about 50 to 70% and most preferably about 60%, and the calcium salt component comprises about 15 to about 50% by weight, preferably about 30 to 50% and most preferably about 40%.

There is also provided according to this invention a composition comprising a halogen-containing organic polymer and, in an amount sufficient to lubricate and stabilize said polymer against deteriorative effects of heat, light and weathering, a lubricant-stabilizer composition comprising the combination of (a) a dihydrocarbyl ester of maleic acid of the formula:

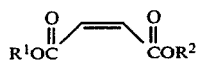

wherein $R^1$ and $R^2$ are straight or branched chain alkyl or alkenyl radicals of at least 8 carbon atoms, preferably from about 8 to about 24 carbon atoms, and most preferably 18 carbon atoms, with (b) a calcium salt of a monohydrocarbyl ester of maleic acid of the formula:

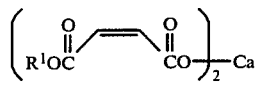

wherein $R^1$ is as defined above. The lubricating-stabilizing composition is generally employed in the halogen-containing polymer in a lubricating-stabilizing effective amount, generally an amount of from about 2 to about 10 parts, preferably from about 3 to about 7 parts, per hundred parts polymer or resin.

The halogen-containing organic polymers which utilize the lubricant-stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. The vinyl halide homopolymers, vinyl halide copolymers and polymer blends containing vinyl halide homopolymers or vinyl halide copolymers usable in the practice of this invention may be, for example, (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha-chloroacrylate, styrene, vinyl ethers such as vinyl ethyl ether, vinyl chloroethyl ether, vinyl phenyl ether; vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units. Of these polymers, the vinyl halide homopolymers are preferred.

The maleic acid diesters useful in this invention are dialkyl or dialkenyl esters of maleic acid wherein the ester moiety contains at least 8 carbon atoms. As examples of alkyl or alkenyl radicals which represent $R^1$ and $R^2$ there may be mentioned, for example, alkyl radicals such as caprylyl, capryl, lauryl, myristyl, palmityl, stearyl arachidyl, behenyl, lignoceryl and cerotyl radicals and alkenyl radicals such as oleyl linoleyl, linolenyl, palmitoleyl, archidonyl, citoleyl, gadoleyl and citoleyl radicals. As example of preferred diesters there may be mentioned, for example, dilauryl maleate, dimyristyl maleate, dipalmityl maleate, diestearyl maleate and dioleyl maleate, (or mixtures thereof) especially distearyl maleate.

The calcium salts of the monoesters of maleic acid useful in this invention are those wherein the ester radical is any of those alkyl or alkenyl radicals mentioned in the preceding paragraph. As examples of preferred calcium salts there may be mentioned, for example, calcium bis(lauryl maleate), calcium bis(oleyl maleate), calcium bis(myristyl maleate), calcium bis(palmityl maleate), calcium bis(stearyl maleate), especially calcium bis(stearyl maleate).

An especially preferred lubricant-stabilizing composition of this invention comprises about 60% by weight distearyl maleate and about 40% by weight calcium bis(stearyl maleate).

The lubricant-stabilizer compositions of this invention are easily prepared, for example, by mixing, blending, stirring or shaking the components together. The lubricant-stabilizer compositions can be incorporated into the polymer by any conventional means, such as by physically blending with the polymer on a roll mill. The lubricant-stabilizer composition is usually incorporated along with other additives or ingredients, such as primary heat stabilizers, pigments, internal lubricants and the like, and uniformly dispersed throughout the polymer composition.

As examples of primary heat stabilizers that may be added to the compositions of this invention there may be mentioned, for example, organotin carboxylates, organotin mercaptides, organotin sulfides, antimony mercaptides and mixed metal salts such as the barium/calcium, calcium/zinc, barium/zinc and barium/cadmium/zinc mixed metal salts of saturated or unsaturated aliphatic, aromatic or alicyclic acids, such as the salts caprylic, capric, lauric, myristic, palmitic, stearic, oleic, linoleic, lanopalmic, cerotic, naphtenic, phthalic acid and the like.

The amount of lubricant-stabilizer composition employed in the halogen-containing organic polymer compositions of this invention can very considerably. The minimum amount of lubricant-stabilizer in the polymer composition is that amount which will lubricate and stabilize the polymer against the deteriorative effects of heat, light and weathering. While this minimum amount can vary depending upon factors such as the particular polymer, the severity of the heat, light and weathering to which the polymer will be subjected, in general about 2.0% to about 10.0%, peferably about 3% to 7%, of lubricant-stabilizer composition based on the weight of halogen-containing organic polymer will be sufficient to impart the desired properties to the polymer composition in most cases. Amounts greater than this minimum level of stabilizer can, of course, be employed, although at some point the increase in stabilization of the polymer is not commensurate with the additional amount of stabilizer employed. Thus, while there is no critical upper limit to the amount of lubricant-stabilizer which may be employed, amounts in excess of about 10% do not give an increase in effectiveness which will justify the use of these higher amounts of stabilizer. In fact, amounts above about 8–10% of stabilizer composition may begin to plasticize the polymer and change its physical properties dramatically.

The stabilized polymer compositions of this invention are useful to form a variety of rigid articles of manufacture, such as, housing siding, window profiles and the like, and are especially useful in those articles which are exposed to light and weathering. A variety of conventional techniques may be employed to shape the polymer composition into the desired article.

The following examples illustrate the present invention. Unless otherwise indicated, all parts and percentages in the examples and throughout this specification are by weight.

EXAMPLES 1 to 3

The lubricant-stabilizer compositions indicated in Table I were each in turn blended with the same standard poly(vinyl chloride) formulation containing:

| INGREDIENT | PARTS BY WEIGHT |
| --- | --- |
| Poly (vinyl chloride)-Geon 103 EP sold by B. F. Goodrich (K = 68) | 100.0 |
| Process aid | 1.5 |
| Impact modifier | 6.0 |
| Pigment | Approx. 1.0 |
| Partially oxidized polyethylene | 0.2 |
| Dialkyl tin mercaptide (primary stabilizer) | 1.5 |

The abbreviations utilized have the following meanings:
DSM—Distearyl maleate
CaSM—Calcium bis(stearyl maleate)
DLM—Dilauryl maleate
CaLM—Calcium bis(lauryl maleate)
DMM—Dimyristyl maleate
CaMM—Calcium bis(myristyl maleate)
PHR—Parts per hundred parts resin

TABLE 1

| Example No. | Composition | PHR |
| --- | --- | --- |
| 1. | DSM/CaSM | 2.0/1.5 |
| Control A | DSM | 3.5 |
| Control B | CaSM | 3.5 |
| 2. | DMM/CaMM | 2.0/1.5 |
| Control C | DMM | 3.5 |
| Control D | CaMM | 3.5 |
| 3. | DLM/CaLM | 2.0/1.5 |
| Control E | DLM | 3.5 |
| Control F | CaLM | 3.5 |

Each resulting polymer composition was then tested for stability to heat by melting on a two roll dynamic mill at about 195° C. with a forward roll speed of 30 rpm and a rearward roll speed of 40 rpm. Samples of each composition were taken after every two minutes of milling and examined for degradation and discoloration.

A Hunter Colorimeter instrument (model D25A-9) designed to quantify color difference between a desired color standard and a specimen was used to determine the color change associated with thermal or photodegradation of PVC.

The color change determination procedure employed is as follows. A specimen is placed under a beam of incident light, which strikes its surface at a 45° angle. The wave lengths of the light reflected off the surface of the sample are then determined, and a number is assigned relative to the intensity of those wave lengths. Since it is reflected light rather than absorbed light which provides the appearance of color, an accurate quantification can be achieved. The instrument light chamber is equipped with a series of mirrors so that deflected light due to surface irregularities is also detected, this assures a certain degree of reproducibility.

The instrument has memory capabilities so that value of a standard color is stored and color changes from that standard is immediately determined. The values determined by the colorimeter are:

L value=an indication of total whiteness, 0–100 where 0=black, 100=white.

a value=a relative scale ($-a \rightarrow +a$) which determines the contribution of green and red to the total color. As the a value becomes more negative, the intensity of green is greater. The (a) value increases in a positive direction when the reflected wavelength of light associated with red increases in intensity. Since green and red are complimentary colors, when their wavelengths are of equivalent magnitude the a value is zero ($+a - a = 0$). The net result is no color contribution from green or red to the total color.

b value=identical rational to the (a) scale except $-b$ represents the intensity of blue and $+b$ represents the intensity of yellow.

$\Delta E$=total color change relative to a standard. The value combines, L, a and b readings in a mathematical representation and then determines the magnitude of change from the product standard.

Figure 2:
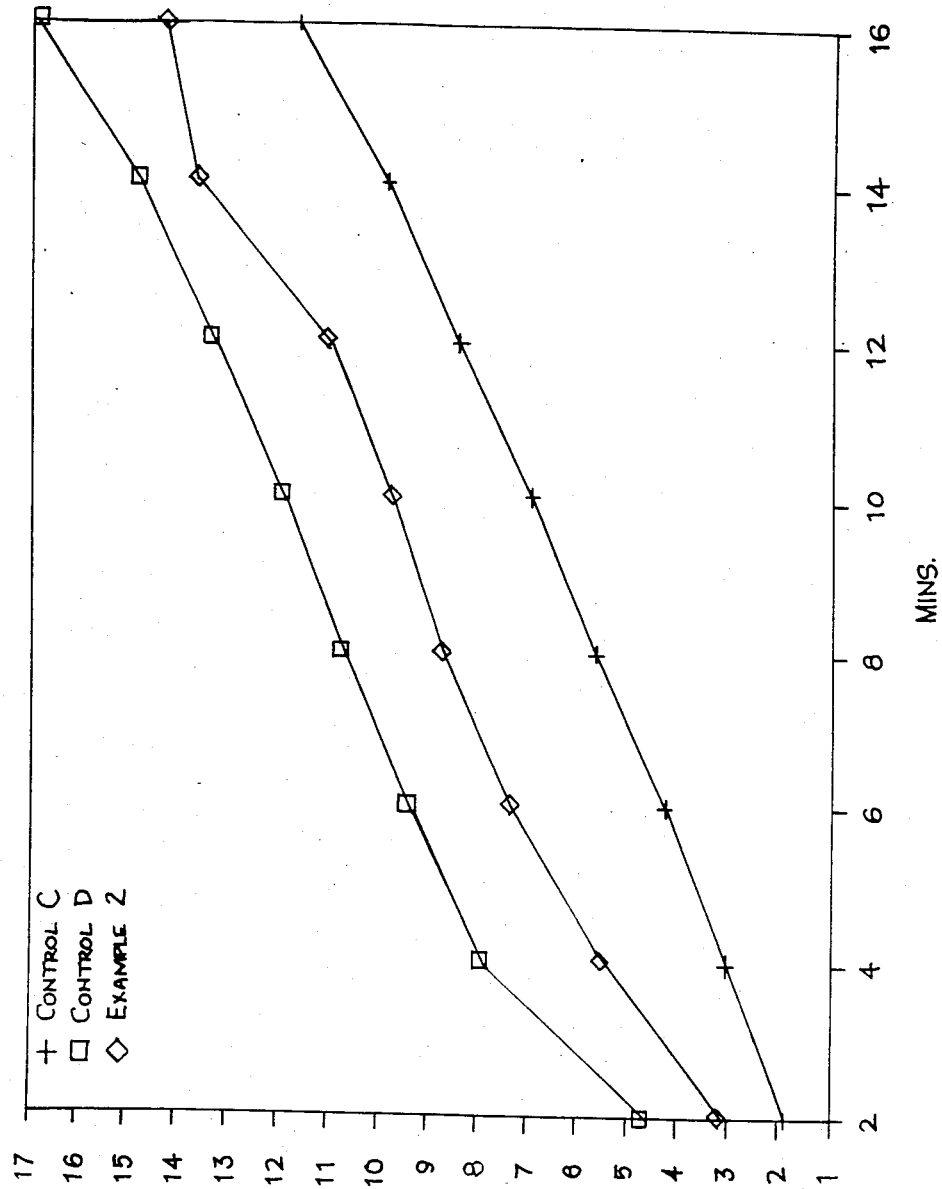
FIGS. 2 and 3 are plots similar to FIG. 1 for polymeric compositions containing other lubricating-stabilizing compositions of the invention as well as control compositions.
Figure 3:
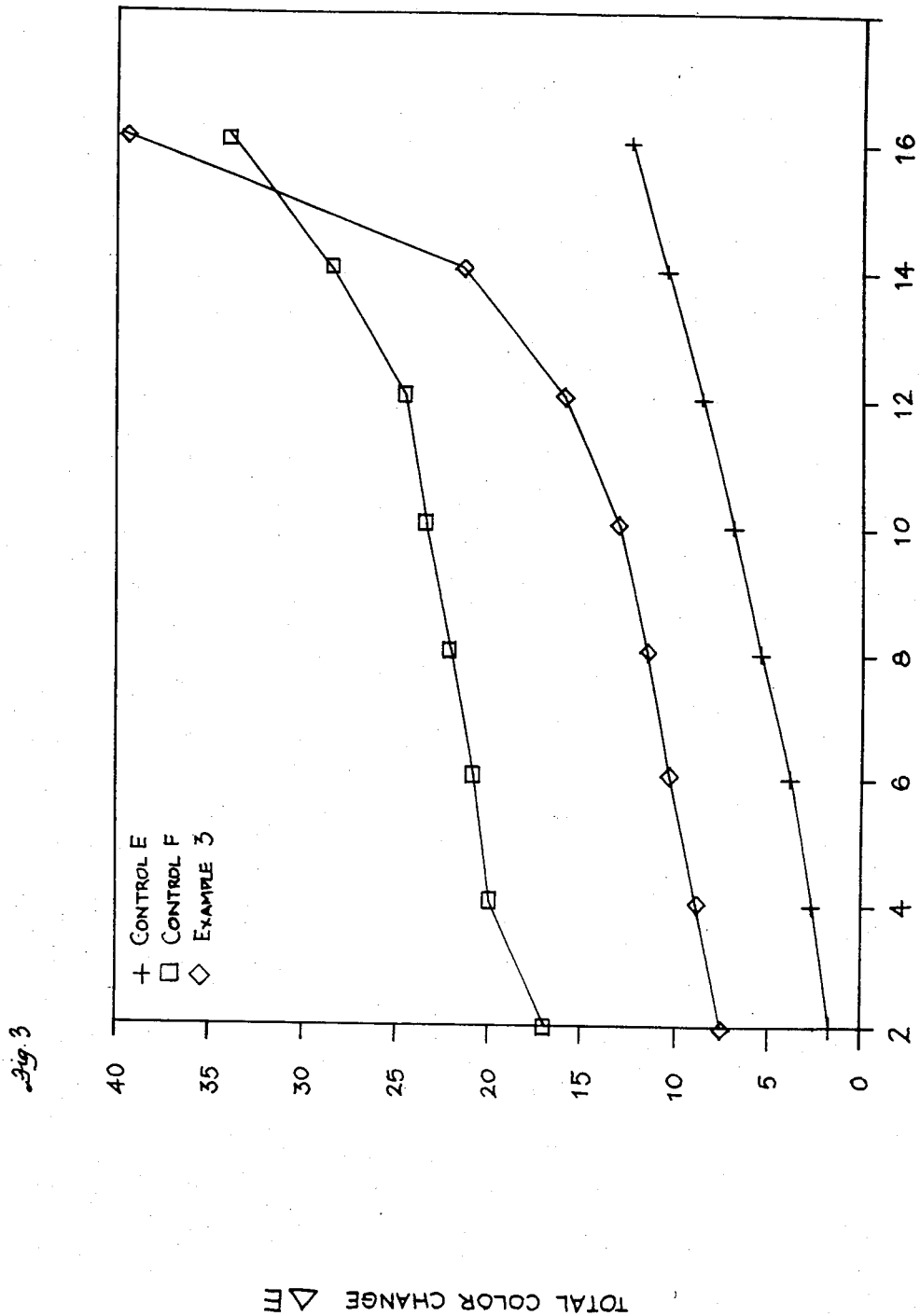

The results of the dynamic mill testing are shown in FIGS. 1 to 3. As shown in FIG. 1 the total color change of the combination of this invention is unexpectedly better than either DSM or CaSM alone at the level of the combination. FIGS. 2 and 3 show that the stabilization of the polymer compositions against that induced color change is desirably improved by replacement of a portion of the poor calcium salt (CaLM and CaMM) with the diester compounds (DLM and DMM).

Even more significantly the lubricant-stabilizer formulations of this invention provide unexpectedly improved lubrication and fusion time properties. Fusion time properties of the formulations during processing were determined by working 65 grams of each formulation in a Brabender Plasticorder using a No. 6 mixing head, oil heated, with roller type blades. Oil temperature was maintained at 170° C. and the blade was run at 40 rpm. Fusion time was measured as the time between formulation loading and the time of development of maximum torque after compaction. The results are plotted in FIGS. 4 through 6.

Figure 4:
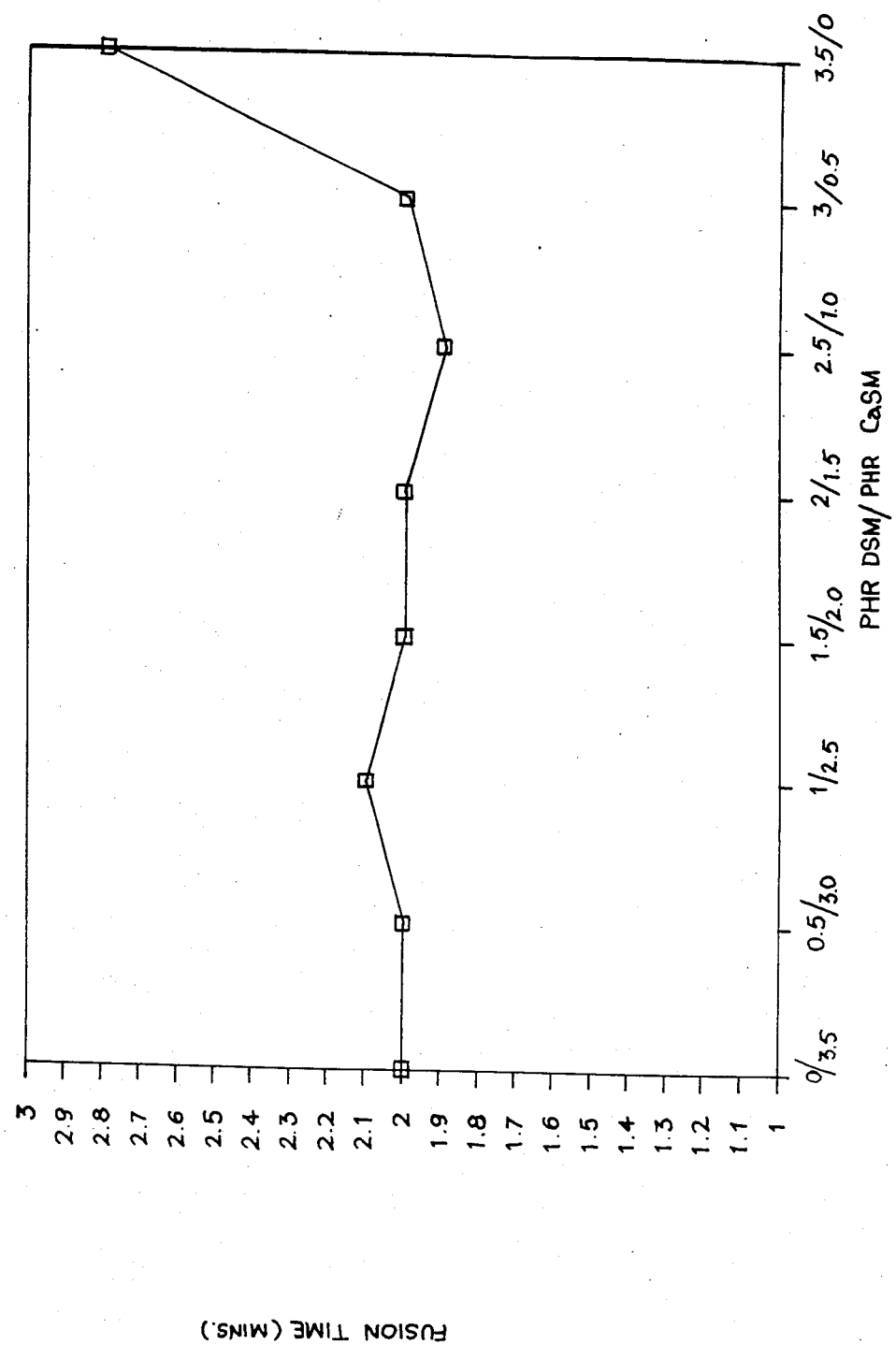
FIG. 4 is a plot of fusion time obtained for polymeric compositions with various ratios of distearyl maleate/calcium bis(myristyl maleate) lubricating-stabilizing compositions.
Figure 5:
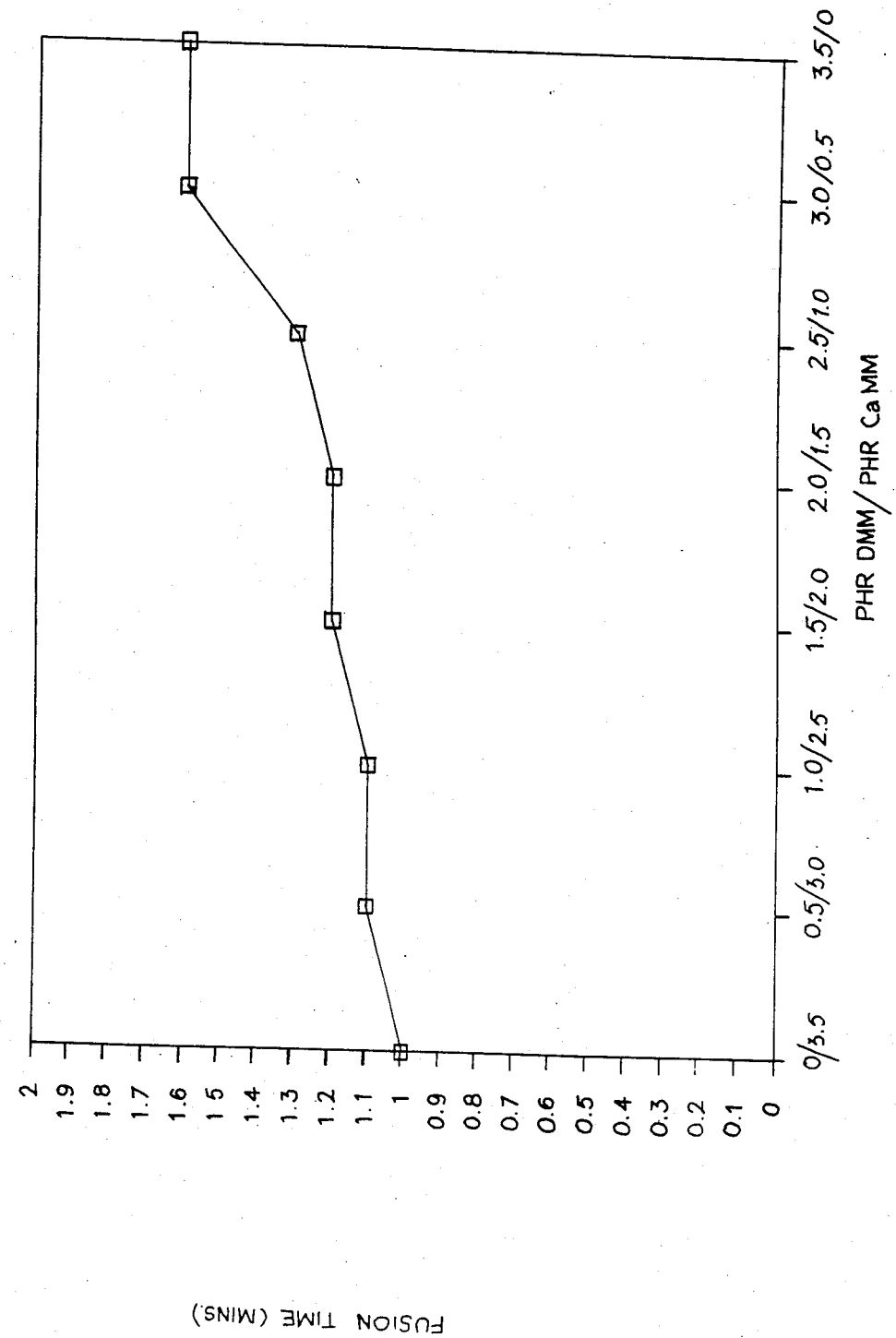
FIGS. 5 and 6 are plots similar to FIG. 4 for various ratios of dimyristyl maleate/calcium bis(myristyl maleate) and dilauryl maleate/calcium bis(lauryl maleate) lubricating-stabilizing compositions, respectively.
Figure 6:
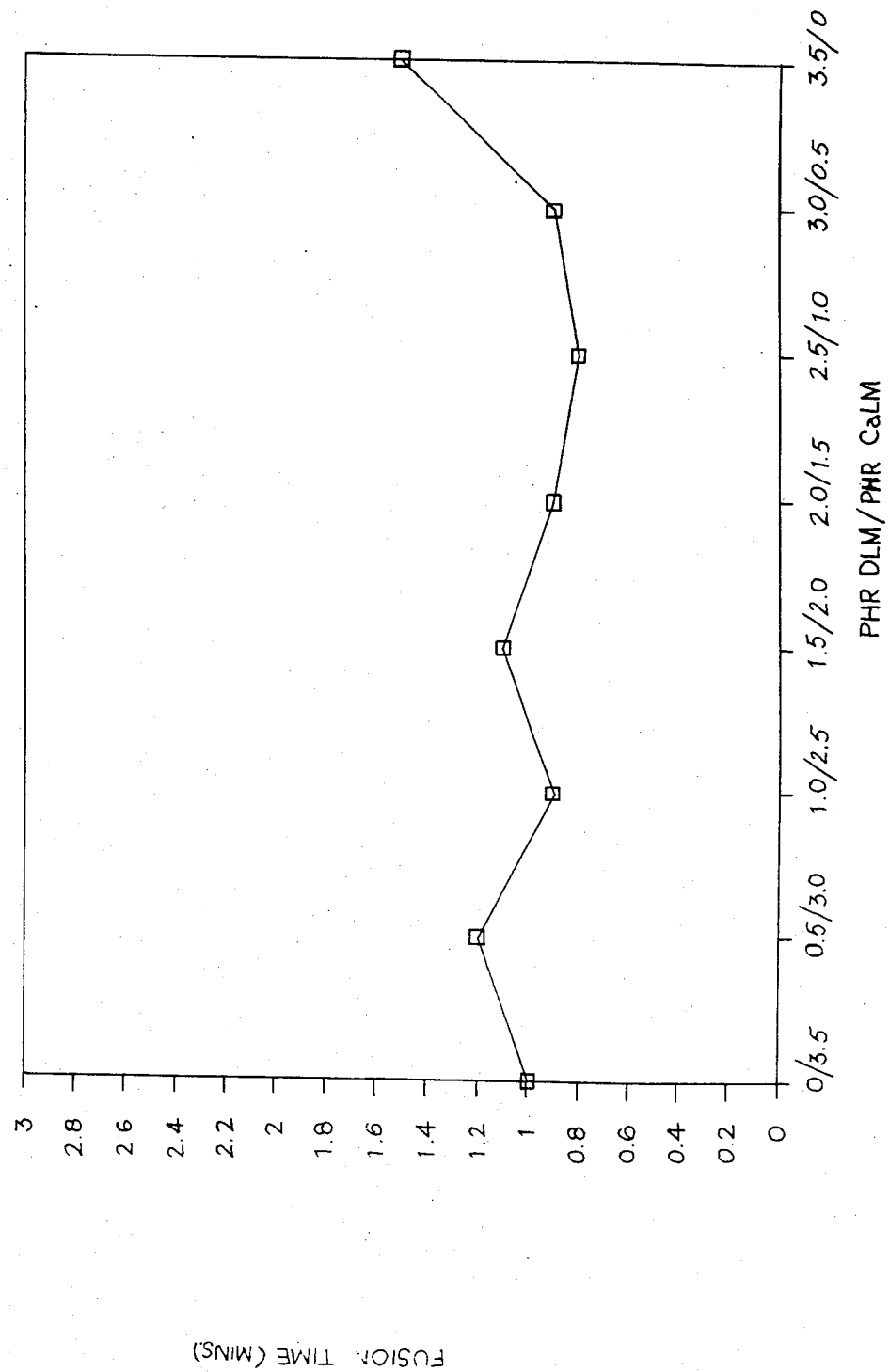

FIG. 4 is a plot of the fusion time for various ratios of DSM/CaSM at a level of incorporation into the polymer composition of 3.5 phr. FIGS. 5 and 6 are similar photos of fusion times for ratios of DMM/CaMM and DLM/CaLM, respectively.

In each instance the data shows that even when as much as about 85% of the calcium salt component is replaced with the corresponding maleate diester the desirable fusion time property imparted to the resin formulation by the calcium salt is not significantly adversely affected. Thus, one is able to obtain the highly desirable fusion time properties of the calcium salts of the maleate monoesters even when up to 85% of the calcium salt is replaced with maleate diesters that, by themselves, produce undesirably poor fusion time properties. Yet, as shown by FIGS. 1 through 3, the beneficial stabilizing effects of the maleate diesters is also obtained. It is unexpected that replacement of a significant portion (50 to 85%) of the calcium salt with a corresponding diester would enable one to obtain the stabilization benefits due to the presence of the diester component yet not produce the undesirable fusion time properties associated with the presence of the diester component.

What is claimed is:

1. A lubricating-stabilizing composition for halogen-containing organic polymers comprising:
   (a) from about 50 to about 85% by weight of a dihydrocarbyl ester of maleic acid of the formula:

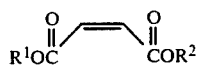

(b) from about 15 to about 50% by weight of a calcium salt of a monohydrocarbyl ester of maleic acid of the formula:

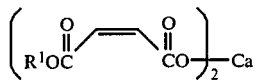

wherein $R^1$ and $R^2$ are each selected from the group consisting of alkyl and alkenyl radicals having at least 8 carbon atoms.

2. The lubricating-stabilizing composition of claim 1 wherein the alkyl and alkenyl radicals have from 8 to 24 carbon atoms.

3. The lubricating-stabilizing composition of claim 1 wherein $R^1$ and $R^2$ are alkyl radicals.

4. The lubricating-stabilizing composition of claim 2 wherein $R^1$ and $R^2$ are alkyl radicals.

5. The lubricating-stabilizing composition of claim 1 wherein the calcium salt comprises from about 30 to 50% by weight and the diester comprises from about 50 to 70% by weight.

6. The lubricating-stabilizing composition of claim 2 wherein the calcium salt comprises from about 30 to 50% by weight and the diester comprises from about 50 to 70% by weight.

7. The lubricating-stabilizing composition of claim 4 wherein the diester component is selected from the group consisting of dilauryl maleate, dimyristyl maleate and distearyl maleate and the calcium salt component is selected from the group consisting of calcium bis(lauryl maleate), calcium bis(myristyl maleate) and calcium bis(stearyl maleate).

8. The lubricating-stabilizing composition of claim 5 wherein the diester component is selected from the group consisting of dilauryl maleate, dimyristyl maleate and distearyl maleate and the calcium salt component is selected from the group consisting of calcium bis(lauryl maleate), calcium bis(myristyl maleate) and calcium bis(stearyl maleate).

9. The lubricating-stabilizing composition of claim 1 comprising about 60% by weight distearyl maleate and about 40% by weight calcium bis(stearyl maleate).

10. A polymeric composition comprising a halogen containing organic polymer and a lubricating-stabilizing effective amount of a lubricating-stabilizing composition of claim 1.

11. A polymeric composition comprising a halogen containing organic polymer and a lubricating-stabilizing effective amount of a lubricating-stabilizing composition of claim 2.

12. A polymeric composition comprising a halogen containing organic polymer and a lubricating-stabilizing effective amount of a lubricating-stabilizing composition of claim 3.

13. A polymeric composition comprising a halogen containing organic polymer and a lubricating-stabilizing effective amount of a lubricating-stabilizing composition of claim 4.

14. A polymeric composition comprising a halogen containing organic polymer and a lubricating-stabilizing effective amount of a lubricating-stabilizing composition of claim 5.

15. A polymeric composition comprising a halogen containing organic polymer and a lubricating-stabilizing effective amount of a lubricating-stabilizing composition of claim 6.

16. A polymeric composition comprising a halogen containing organic polymer and a lubricating-stabilizing effective amount of a lubricating-stabilizing composition of claim 7.

17. A polymeric composition comprising a halogen containing organic polymer and a lubricating-stabilizing effective amount of a lubricating-stabilizing composition of claim 8.

18. A polymeric composition comprising a halogen containing organic polymer and a lubricating-stabilizing effective amount of a lubricating-stabilizing composition of claim 9.

19. The polymeric composition of claim 11 wherein the halogen-containing organic polymer is a polyvinyl halide polymer.

20. The polymeric composition of claim 18 wherein the halogen-containing organic polymer is a polyvinyl halide polymer.

21. The polymeric composition of claim 10 containing a primary heat stabilizer selected from the group consisting of organotin carboxylates, organotin mercaptides, organotin sulfides, antimony mercaptides and mixed metal salts of barium/calcium, calcium/zinc, barium/zinc or barium/calcium/zinc.

22. The polymeric composition of claim 11 containing a primary heat stabilizer selected from the group consisting of organotin carboxylates, organotin mercaptides, organotin sulfides, antimony mercaptides and mixed metal salts of barium/calcium, calcium/zinc, barium/zinc or barium/calcium/zinc.

23. The polymeric composition of claim 18 containing a primary heat stabilizer selected from the group consisting of organotin carboxylates, organotin mercaptides, organotin sulfides, antimony mercaptides and mixed metal salts of barium/calcium, calcium/zinc, barium/zinc or barium/calcium/zinc.

24. The polymeric composition of claim 19 containing a primary heat stabilizer selected from the group consisting of organotin carboxylates, organotin mercaptides, organotin sulfides, antimony mercaptides and mixed metal salts of barium/calcium, calcium/zinc, barium/zinc or barium/calcium/zinc.

25. The polymeric composition of claim 20 containing a primary heat stabilizer selected from the group consisting of organotin carboxylates, organotin mercaptides, organotin sulfides, antimony mercaptides and mixed metal salts of barium/calcium, calcium/zinc, barium/zinc or barium/calcium/zinc.

* * * * *